(12) United States Patent
Liu

(10) Patent No.: US 10,847,099 B2
(45) Date of Patent: Nov. 24, 2020

(54) ARRAY SUBSTRATE, DISPLAY PANEL AND DISPLAY APPARATUS

(71) Applicants: HKC Corporation Limited, Shenzhen (CN); Chongqing HKC Optoelectronics Technology Co., Ltd., Chongqing (CN)

(72) Inventor: Zhongnian Liu, Guangdong (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 36 days.

(21) Appl. No.: 16/245,401

(22) Filed: Jan. 11, 2019

(65) Prior Publication Data

US 2020/0105210 A1    Apr. 2, 2020

Related U.S. Application Data

(63) Continuation of application No. PCT/CN2018/114456, filed on Nov. 8, 2018.

(30) Foreign Application Priority Data

Sep. 30, 2018  (CN) .................... 2018 2 1620008 U

(51) Int. Cl.
*G02F 1/1362* (2006.01)
*G09G 3/36* (2006.01)
*G02F 1/1345* (2006.01)

(52) U.S. Cl.
CPC ....... *G09G 3/3607* (2013.01); *G02F 1/13454* (2013.01); *G02F 1/136259* (2013.01); *G09G 3/3674* (2013.01); *G09G 3/3685* (2013.01)

(58) Field of Classification Search
CPC .................... G02F 1/13454; G02F 1/136259
See application file for complete search history.

(56) References Cited

U.S. PATENT DOCUMENTS

2004/0125332 A1    7/2004  Choi
2009/0268119 A1*  10/2009  Lee ................ H01L 27/124
                                                             349/54

FOREIGN PATENT DOCUMENTS

| CN | 1570742 A | 1/2005 |
|---|---|---|
| CN | 101424792 A | 5/2009 |
| CN | 102402943 A | 4/2012 |
| CN | 102736341 A | 10/2012 |
| CN | 106226966 A | 12/2016 |
| CN | 108594551 A | 9/2018 |

* cited by examiner

*Primary Examiner* — Edmond C Lau

(57) ABSTRACT

Disclosed are an array substrate, a display panel and a display apparatus. Two adjacent pixel electrodes of the array substrate are spaced from each other by a data line, and a spare element strides across the data line and is connected with at least one pixel electrode in an insulated manner.

15 Claims, 5 Drawing Sheets

ARRAY SUBSTRATE, DISPLAY PANEL AND DISPLAY APPARATUS

CROSS REFERENCE TO RELATED APPLICATIONS

The present application is a Continuation Application of PCT Application No. PCT/CN2018/114456 filed on Nov. 8, 2018, which claims the benefit of Chinese Patent Application No. 201821620008.8, filed on Sep. 30, 2018, which is incorporated herein by reference in its entirety.

FIELD OF THE DISCLOSURE

The present disclosure relates to the field of display technologies, and in particular, to an array substrate, a display panel and a display apparatus.

BACKGROUND OF THE DISCLOSURE

During the production process of a liquid crystal display, because of foreign particles or problems brought about in manufacturing procedures, structures on an array substrate are affected, forming defects such as bright dots and bright lines. A part of the defects can be repaired, for example, some defects caused by thin film residuals and foreign particles can be repaired into normal dots through a repairing process, and other severe or unrepairable defects into dark dots. However, dark dots still greatly affect the overall yield of array substrates and the quality of liquid crystal module products, and thus markedly reduce the performance and quality of products.

SUMMARY OF THE DISCLOSURE

A main objective of the present disclosure is to provide an array substrate to improve product performance.

To realize the foregoing objective, an array substrate provided herein includes a backplane, and a plurality of scanning lines and a plurality of data lines which are both formed on the backplane, wherein a plurality of pixel units are defined by intersecting the plurality of scanning lines and the plurality of data lines in an insulated manner;

each of the pixel units comprises a switch element and a pixel electrode electrically connected with the switch element, the pixel electrode is electrically connected with a corresponding scanning line and a corresponding data line through the switch element, at least one spare element is arranged between two adjacent pixel electrodes, the two adjacent pixel electrodes are spaced from each other through a data line, and the spare element strides across the data line and is connected with at least one pixel electrode in an insulated manner.

Optionally, the spare element is arranged on a layer different from that on which the data line is arranged and is at least partially arranged on the backplane, and a first insulating layer is arranged between a part of the spare element that is arranged on the backplane and the data line.

Optionally, a second insulating layer is arranged between the two adjacent pixel electrodes and the data line, and each pixel electrode is electrically connected with the data line through a corresponding switch element.

Optionally, the spare element includes a suspended metal piece arranged on the backplane, and a projected area of each of the pixel electrodes on the backplane is at least partially overlapped with that of the suspended metal piece on the backplane.

Optionally, the spare element includes a suspending metal block and an electrode bar that are arranged at an interval, the suspending metal block is arranged on the backplane, the electrode bar is electrically connected with one of the pixel electrodes and spaced from an adjacent pixel electrode across the data line;

a projected area of the suspending metal block on the backplane is at least partially overlapped with that of a pixel electrode unconnected with the electrode bar on the backplane, and a projected area of the electrode bar on the backplane is at least partially overlapped with that of the suspending metal block on the backplane.

Optionally, the spare element is arranged on one end of the two adjacent pixel electrodes that is away from the switch element.

Optionally, the pixel unit further includes a common electrode arranged in such a manner that the common electrode is insulated from a corresponding pixel electrode.

Optionally, the switch element includes a control terminal, an input terminal and an output terminal, the control terminal is electrically connected with a corresponding scanning line, the input terminal is electrically connected with a corresponding data line, and the output terminal is electrically connected with a corresponding pixel electrode.

The present disclosure further provides a display panel including an array substrate, which includes a backplane, and a plurality of scanning lines and a plurality of data lines that are both formed on the backplane, wherein a plurality of pixel units are defined by intersecting the plurality of scanning lines and the plurality of data lines in an insulated manner;

each of the pixel units includes a thin film transistor and a pixel electrode electrically connected with the thin film transistor, the pixel electrode is electrically connected with a corresponding scanning line and a data line through the thin film transistor, at least one spare element is arranged between two adjacent pixel electrodes, the two adjacent pixel electrodes are spaced from each other through a data line, and the spare element strides across the data line and is connected with at least one pixel electrode in an insulated manner.

The present disclosure further provides a display apparatus including a display panel, wherein the display panel includes an array substrate which includes a backplane and a plurality of scanning lines and a plurality of data lines that are formed on the backplane, and a plurality of pixel units are defined by intersecting the plurality of scanning lines and the plurality of data lines in an insulated manner;

each of the pixel units includes a thin film transistor and a pixel electrode electrically connected with the thin film transistor, the pixel electrode is electrically connected with a corresponding scanning line and a data line through the thin film transistor, at least one spare element is arranged between two adjacent pixel electrodes, the two adjacent pixel electrodes are spaced from each other through a data line, and the spare element strides across the data line and is connected with at least one pixel electrode in an insulated manner.

By arranging, between two adjacent pixel units, at least one spare element which strides across a data line and is connected with at least one pixel unit in an insulated manner, the array substrate provided herein charges a corresponding pixel electrode through a switch element when functioning normally, at this time, the two adjacent pixel electrodes coincide with each other in brightness; when one pixel unit is defective, the two adjacent pixel electrodes are electrically connected through the spare element so that a defect repair is achieved because the two pixel electrodes have the same brightness, as a result, both a bright dot and a dark dot can be repaired, thus improving product performance, moreover, occupying little space, the spare element is convenient to arrange and greatly improves repair efficiency.

BRIEF DESCRIPTION OF THE DRAWINGS

To illustrate the technical solutions according to the embodiments of the present disclosure more clearly, the accompanying drawings for describing the embodiments are introduced briefly in the following. Apparently, the accompanying drawings in the following description are only about some embodiments of the present disclosure, and persons of ordinary skill in the art can derive other drawings from the accompanying drawings without creative efforts.

Labels illustration for drawings.

Figure 1:
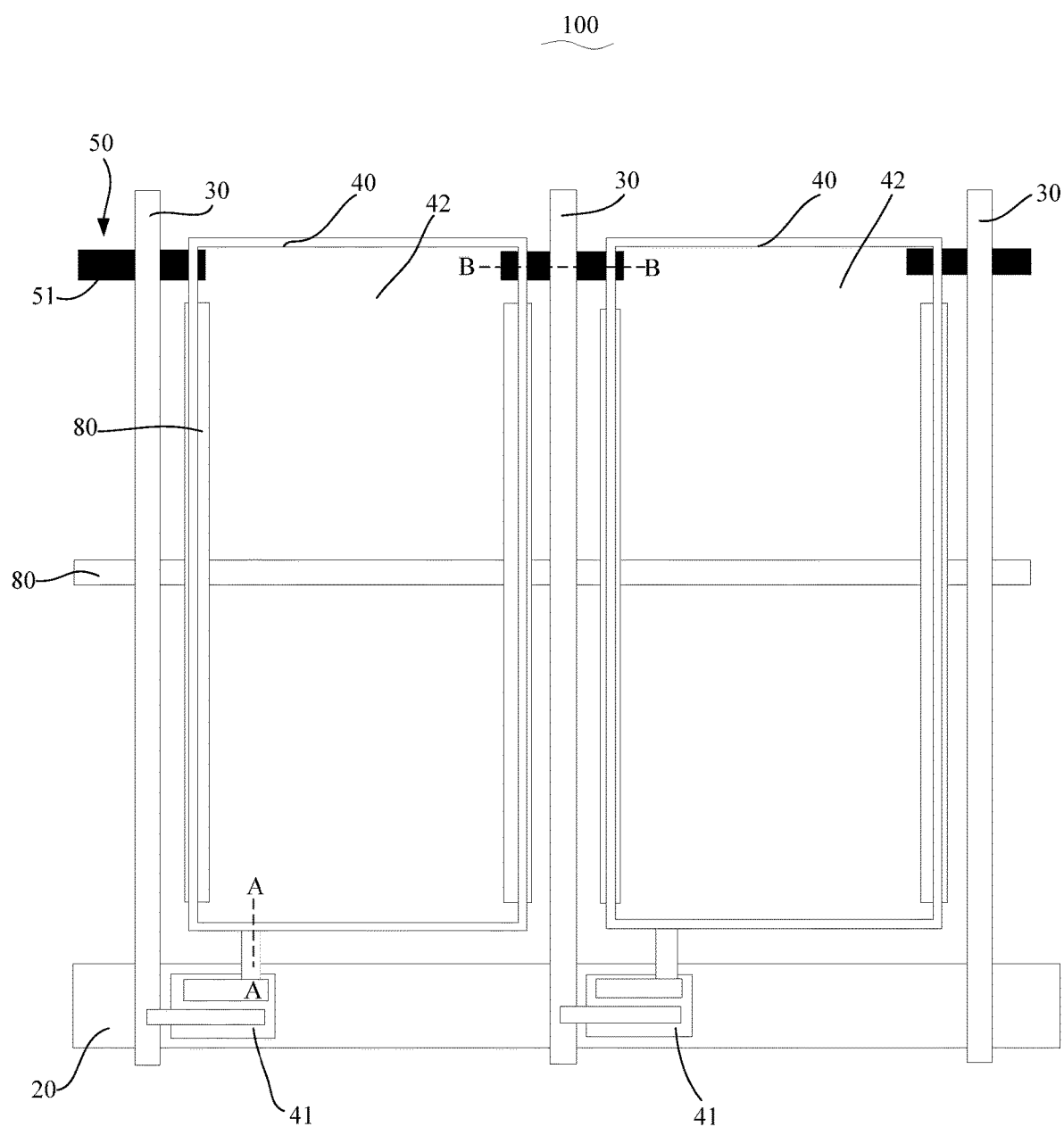
FIG. 1 is a schematic diagram illustrating a planar structure of an embodiment of an array substrate according to the present disclosure.
Figure 2:
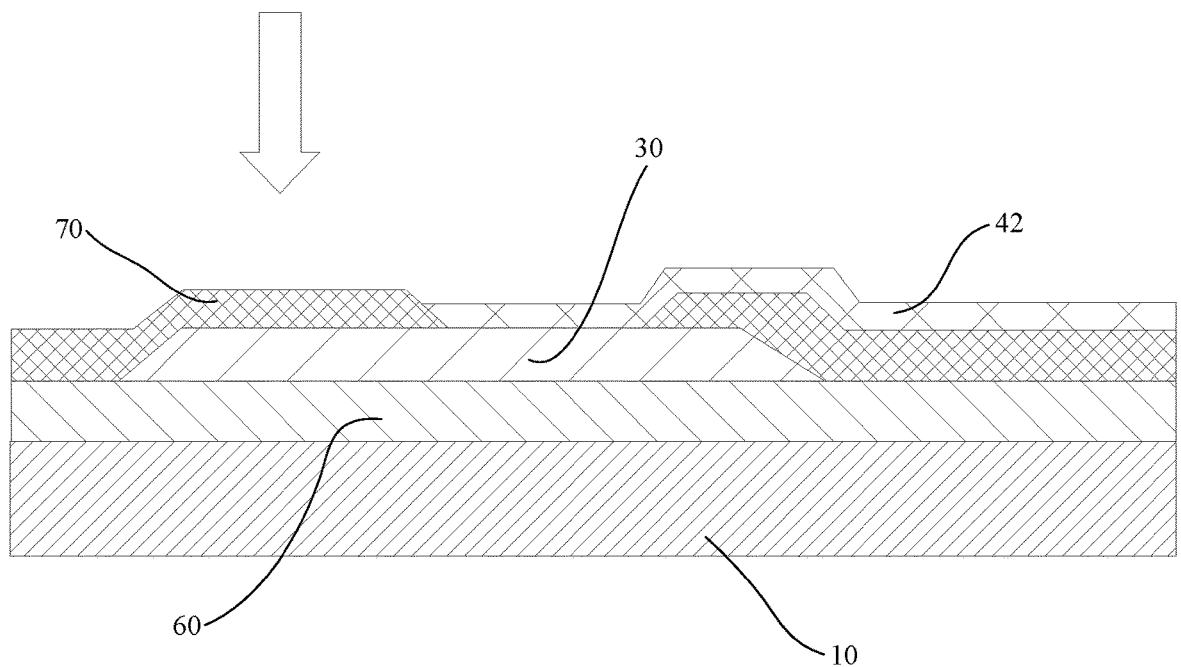
FIG. 2 is a partial sectional view of a part A-A shown in FIG. 1 before a laser cutting operation is performed.
Figure 3:
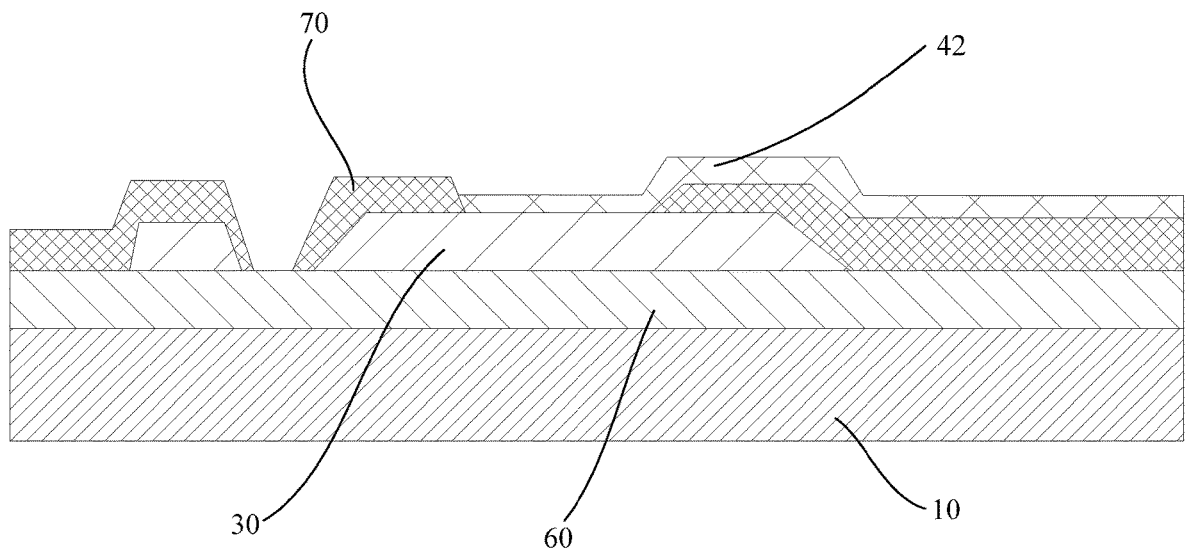
FIG. 3 is a partial sectional view of the part A-A shown in FIG. 1 after a laser cutting operation is performed.

| Label | Name |
|---|---|
| 100 | Array substrate |
| 10 | backplane |
| 20 | Scanning line |
| 30 | Data line |
| 40 | Pixel unit |
| 41 | Switch element |
| 42 | Pixel electrode |
| 50 | Spare element |
| 51 | Suspended metal piece |
| 52 | Suspending metal block |
| 53 | Electrode bar |
| 60 | First insulating layer |
| 70 | Second insulating layer |
| 80 | Common electrode |

The realizing of the aim, functional characteristics, advantages of the present disclosure are further described in detail with reference to the accompanying drawings and the embodiments.

DETAILED DESCRIPTION OF THE EMBODIMENTS

The technical solutions of embodiments of the present disclosure will be clearly and completely described in the following with reference to the accompanying drawings. It is obvious that the embodiments to be described are only a part rather than all of the embodiments of the present disclosure. All other embodiments obtained by persons of ordinary skill in the art based on the embodiments of the present disclosure without creative efforts shall fall within the scope of protection of the present disclosure.

It is to be understood that, all of the directional instructions in the embodiments of the present disclosure (such as top, down, left, right, front, back . . . ) can only be used for explaining relative position relations, moving condition of the elements under a special form (referring to figures), and so on, if the special form changes, the directional instructions changes accordingly.

In the present disclosure, the terms "connection", "fixation" and the like should be broadly understood, unless otherwise clearly indicated and specified, for example, "connection" may refer to a fixed connection, or a detachable connection, or an integration, or a mechanical connection, or an electric connection, or a direct connection, or an indirect connection realized through an intermediate medium, or an internal communication or an interaction relationship of two elements, unless otherwise indicated clearly. Specific meanings of the foregoing terms in the present disclosure can be appreciated by persons of ordinary skill in the art according to specific circumstances.

In addition, the descriptions, such as the "first", the "second" in the present disclosure, can only be used for describing the aim of description, and cannot be understood as indicating or suggesting relative importance or impliedly indicating the number of the indicated technical character. Therefore, the character indicated by the "first", the "second" can express or impliedly include at least one character. In addition, technical solutions of different embodiments can be combined with each other, however the technical solutions must base on that persons of ordinary skill in the art can realize the technical solutions, when the combination of the technical solutions occurs contradiction or cannot realize, it should consider that the combination of the technical solutions is impractical, and is not contained in the protection scope required by the present disclosure.

An array substrate 100 is provided herein.

Figure 6:
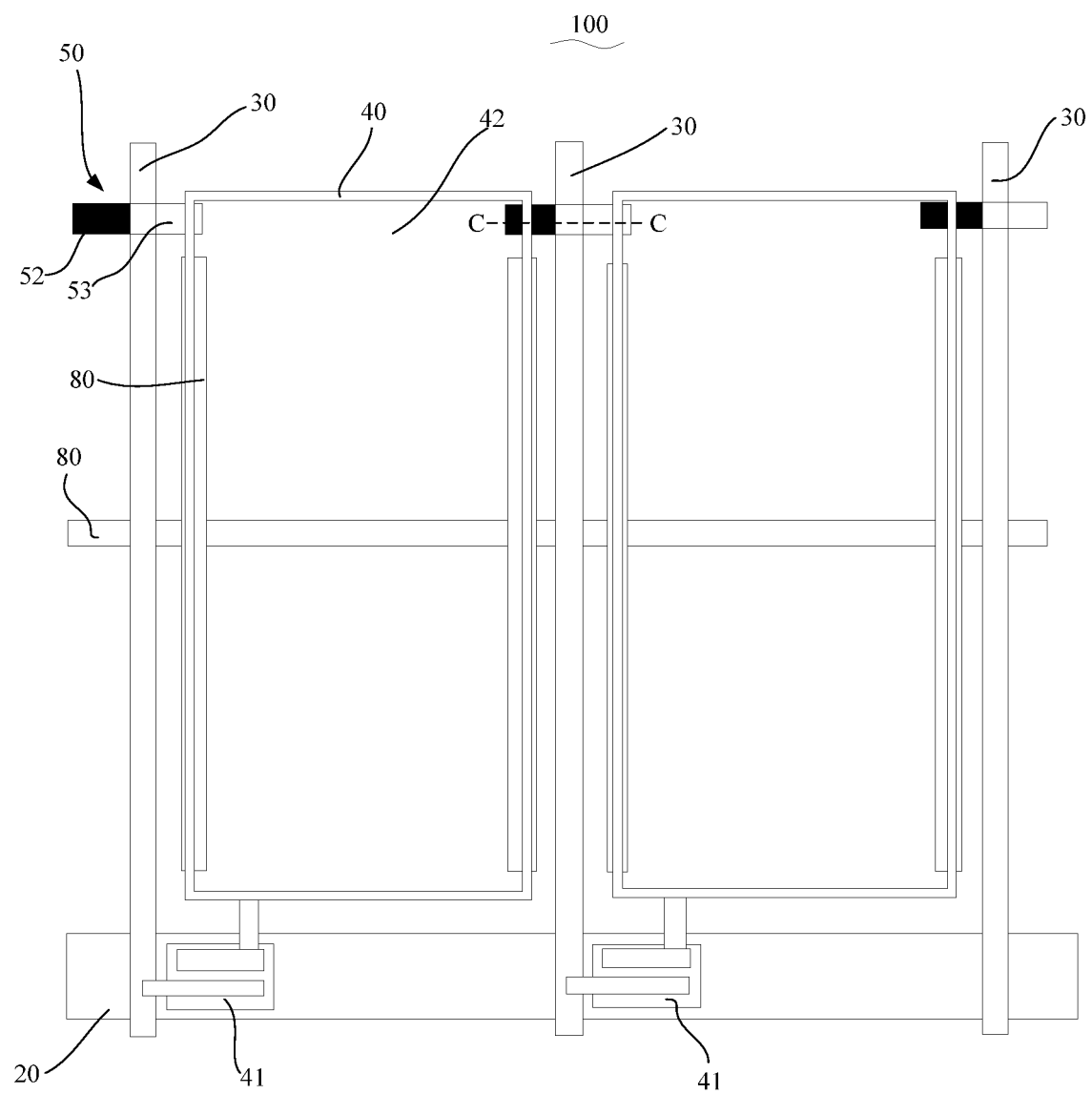
FIG. 6 is a schematic diagram illustrating a planar structure of another embodiment of an array substrate according to the present disclosure.

Referring to FIG. 1 and FIG. 6, in embodiments of the present disclosure, the array substrate 100 includes a backplane 10, and a plurality of scanning lines 20 and a plurality of data lines 30 that are both formed on the backplane 10, wherein a plurality of pixel units 40 are defined by intersecting the plurality of scanning lines 20 and the plurality of data lines 30 in an insulated manner.

Each of the pixel units 40 includes a switch element 41 and a pixel electrode 42 electrically connected with the switch element 41, the pixel electrode 42 is electrically connected with a corresponding scanning line 20 and a corresponding data line 30 through the switch element 41, at least one spare element 50 is arranged between two adjacent pixel electrodes 42, the two adjacent pixel electrodes 42 are spaced from each other through a data line 30, and the spare element 50 strides across the data line 30 and is connected with at least one pixel electrode 42 in an insulated manner.

Specifically, the backplane 10 is a transparent substrate such as a glass substrate, a quartz substrate, or the like. The scanning line 20 and the data line 30 are both made from a conductive material such as aluminum alloy, metal chromium, or the like. The array substrate 100 includes a plurality of pixel units 40 that are arranged into an array, a plurality of pixel units 40 are defined by intersecting the scanning lines 20 and the data lines 30 in an insulated manner, the scanning lines 20 and the data lines 30 are arranged vertical to each other, the plurality of scanning lines 20 are arranged in parallel and spaced at an interval, the plurality of data lines 30 are arranged in parallel and spaced at an interval, and two adjacent data lines 30 and two adjacent scanning lines 20 are enclosed to define a pixel unit 40.

Each pixel unit 40 includes a switch element 41 and a pixel electrode 42 which is electrically connected with a corresponding scanning line 20 and a corresponding data line 30 through the switch element 41. In the embodiment, the switch element 41 includes a control terminal (not shown), an input terminal (not shown), and an output terminal (not shown), the control terminal is electrically connected with a corresponding scanning line 20, the input terminal is electrically connected with a corresponding data line 30, and the output terminal is electrically connected with a corresponding pixel electrode 42. Optionally, the switch element 41 is a thin film transistor, which includes a gate electrode, a source and a drain electrode, the gate electrode, which is electrically connected with a corresponding scanning line 20, is generally made from the same material with the scanning line 20 and formed synchronously with the scanning line 20; the source electrode is electrically connected with a corresponding data line 30; and the drain electrode is electrically connected with a corresponding pixel electrode 42. Typically, the source electrode and the drain electrode are made from the same material with the data line 30 and formed synchronously with the data line 30. The thin film transistor further includes an active layer (not shown), which may include a semiconductor layer and a doped semiconductor layer and is located below the source electrode and the drain electrode and above the gate electrode, wherein the doped semiconductor layer between the source electrode and the drain electrode is completely etched away, and the semiconductor layer between the source electrode and the drain electrode is partially etched away, thereby forming a TFT channel. When a high level is fed to the gate electrode, the source electrode and the drain electrode are electrically connected through the active layer to feed an image signal voltage in the data line 30 to the pixel electrode 42. To keep the insulation between different conductive structures, an insulating layer covering the scanning line 20 and the gate electrode is a gate insulating layer, and an insulating layer covering the data line 30, the active layer, the source electrode and the drain electrode is a passivation layer. The pixel electrode 42 is formed on the passivation layer and is connected with the drain electrode through a through hole on the passivation layer. The pixel electrode may be a semitransparent electrode or a reflecting electrode. When being a semitransparent electrode, the pixel electrode 42 may include a transparent conductive layer. The transparent conductive layer may include, for example, at least one of Indium Tin Oxide (ITO), Indium Zinc Oxide (IZO), Zinc Oxide (ZnO), Indium Oxide ($In_2O_3$), Indium Gallium Oxide (IGO) and Aluminum-doped Zinc Oxide (AZO).

In addition to the transparent conductive layer, the pixel electrode 42 may include a semitransparent reflecting layer for increasing luminous efficiency. The semitransparent reflecting layer may be a thin layer (for example, several nanometers to dozens of nanometers thick) and may contain at least one of Ag, Mg, Al, Pt, Pd, Au, Ni, Nd, Ir, Cr, Li, Ca and Yb.

At least one spare element 50 is arranged between two adjacent pixel electrodes 42, the two adjacent pixel electrodes 42 are spaced from each other through a data line 30, and the spare element 50 strides across the data line 30 and is connected with at least one pixel electrode 42 in an insulated manner. The spare element 50 is made from a conductive material, and optionally, a metal having a low resistance. Because the pixel electrode 42 cannot directly stride across the data line 30, the spare element 50 is arranged for connection, thus, when compared with a case where the pixel electrode 42 strides across the scanning line 20, little space is occupied and the arrangement is facilitated. When arranged integrally, the spare element 50 is connected with the two pixel electrodes in an insulated manner, and when arranged separately, a part of the spare element 50 is connected with one pixel electrode 42 in an insulated manner, and the other part of the spare element 50 is electrically connected with the other pixel electrode 42.

If each pixel unit 40 can be displayed normally after the pixel units 40 are detected, then the spare element 50 causes no effect to a production process or display properties of the array substrate 100 because no signal interference occurs between two adjacent pixel electrodes 42 thanks to the insulated connection between the spare element 50 and at least one pixel pixel 42 and the spare element 50 is not connected with another conductive structure. If a pixel unit 40 displayed abnormally is detected, then at least one of the connection of the switch element 41 and the scanning line 20, that of the switch element 41 and the data line 30, and that of the switch element 41 and the pixel electrode 42 is cut off. In the embodiment, optionally, the connection of the switch element 41 and the pixel electrode 42 is cut off so that the switch element 41 is electrically insulated from the pixel electrode 42.

By arranging, between two adjacent pixel units 40, at least one spare element 50 which strides across a data line 30 and is connected with at least one pixel unit 40 in an insulated manner, the array substrate 100 provided herein charges a corresponding pixel electrode 42 through a switch element 41 when functioning normally, at this time, the two adjacent pixel electrodes 42 coincide with each other in brightness; when one pixel unit 40 is defective, the two adjacent pixel electrodes 42 are electrically connected through the spare element 50 so that a defect repair is achieved because the two pixel electrodes 42 have the same brightness, as a result, both a bright dot and a dark dot can be repaired, thus improving product performance, moreover, occupying little space, the spare element 50 is convenient to arrange and greatly improves repair efficiency.

Referring to FIG. 4, FIG. 5, FIG. 7 and FIG. 8, the spare element 50 is arranged on a layer different from that on which the data line 30 is arranged and is at least partially arranged on the backplane 10, and a first insulating layer 60 is arranged between a part of the spare element 50 on the backplane 10 and the data line 30.

In the embodiment, the spare element 50 is arranged on a layer different from that on which the data line 30 is arranged, it can be appreciated that the spare element 50 and the data line 30 are laminated or arranged with an insulating material sandwiched therebetween so that the spare element 50 can stride across the data line 30, the arrangement of the spare element 50 and the data line 30 on different layers realizes the crossing of a line between different metal layers and thus avoids the short circuit of a signal. When arranged integrally, the spare element 50 is wholly arranged on the backplane 10, in this case, and the first insulating layer 60 is arranged between the spare element 50 and the data line 30, wherein the first insulating layer 60 is arranged to electrically insulate the spare element 50 from the data line 30. When arranged separately, a part of the spare element 50 is arranged on the backplane 50, and the other part of the spare element 50 is electrically connected with another pixel electrode 20, and the part of the spare element 50 arranged on the backplane 10 is insulated from the data line 50 through the first insulating layer 60, which is a gate insulating layer.

Further, a second insulating layer 70 is arranged between the two adjacent pixel electrodes 42 and the data line 30, and each pixel electrode 42 is electrically connected with the data line 30 through a corresponding switch element 41.

In the embodiment, a second insulating layer 70 is arranged between the two adjacent pixel electrodes 42 and the data line 30, the second insulating layer 70 is arranged to electrically insulate the pixel electrode 42 from the data line 30, the pixel electrode 42 is electrically connected with the data line 30 through a corresponding switch element 41, wherein the second insulating layer 70 is an insulating layer made from polyvinyl chloride and having an anti-sunlight property and an anti-sunlight property, a low temperature flexibility, an anti-sunlight property, a low temperature flexibility, a relatively large thickness and a flame resistance level.

Referring to FIG. 1-FIG. 5, in an embodiment, the spare element 50 includes a suspended metal piece 51 arranged on the backplane 10, and a projected area of each of the pixel electrodes 42 on the backplane 10 is at least partially overlapped with that of the suspended metal piece 51 on the backplane 10.

In the embodiment, the spare element 50 is integrally arranged, in this case, the spare element 50 is the suspended metal piece 51 arranged on the backplane 10, and a projected area of each of the pixel electrodes 42 on the backplane 10 is at least partially overlapped with that of the suspended metal piece 51 on the backplane 10, in this way, when a pixel unit 40 is not displayed abnormally, overlapped parts of the pixel electrode 42 and the suspended metal piece 51 can be treated through laser welding or chemical vapor deposition to realize an electric connection between the pixel electrode 42 and the suspended metal piece 51 so that two adjacent pixel electrodes 42 coincide in brightness with each other to eliminate a defect and enable the abnormally displayed pixel unit 40 to be displayed normally.

Figure 7:
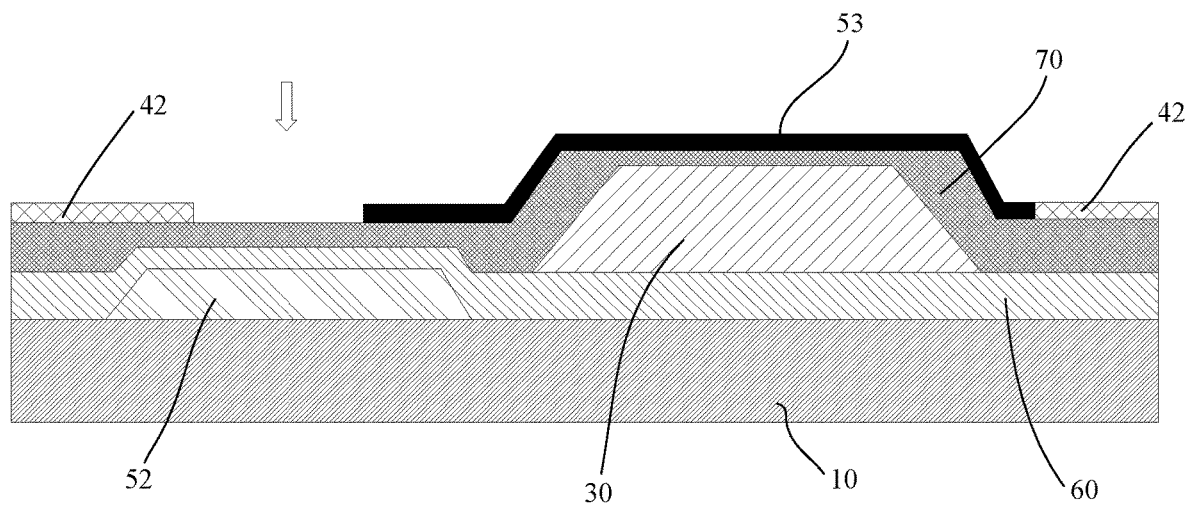
FIG. 7 is a partial sectional view of a part C-C shown in FIG. 6 before a laser welding operation is performed.
Figure 8:
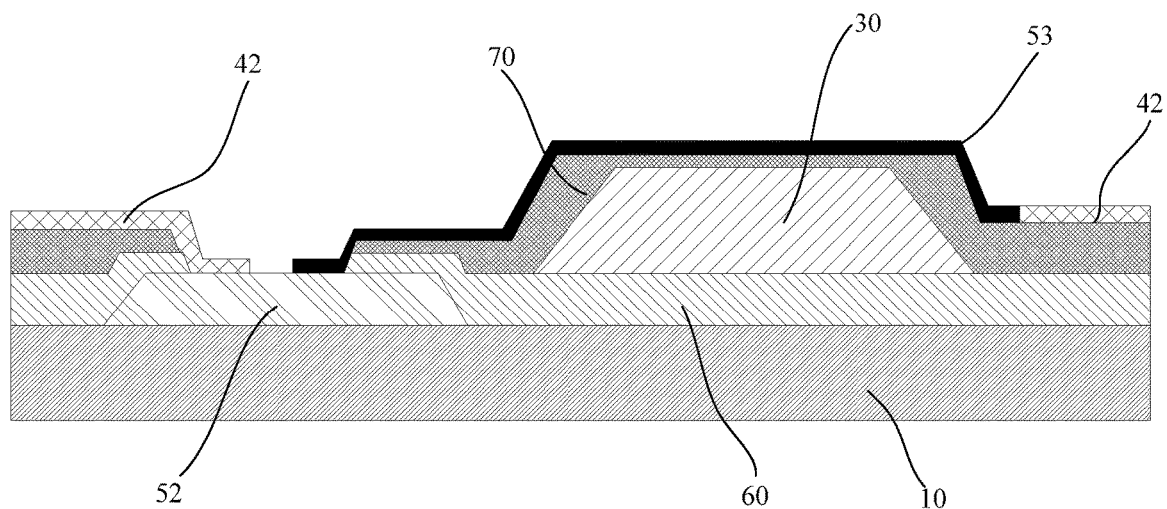
FIG. 8 is a partial sectional view of the part C-C shown in FIG. 6 after a laser welding operation is performed.

Referring to FIG. 6-FIG. 8, in another embodiment, the spare element 50 includes a suspending metal block 52 and an electrode bar 53 that are arranged at an interval, the suspending metal block 52 is arranged on the backplane 10, and the electrode bar 53 is electrically connected with one of the pixel electrodes 42 and spaced from an adjacent pixel electrode 42 across the data line 30;

a projected area of the suspending metal block 52 on the backplane 10 is at least partially overlapped with that of a pixel electrode 42 unconnected with an electrode bar 53 on the backplane 10, and a projected area of the electrode bar 53 on the backplane 10 is at least partially overlapped with that of the suspending metal block 52 on the backplane 10.

In the embodiment, the spare element 50 is arranged separately, in this case, the spare element 50 includes the suspending metal block 52 and the electrode bar 53 which are arranged separately, wherein the suspending metal block 52 is arranged on the backplane 10 and is insulated from the data line 30 through the first insulating layer 60. The electrode bar 53 is electrically connected with the pixel electrode 42 and spaced from an adjacent pixel electrode 42 across the data line 30, the electrode bar 53 is optionally arranged on an edge of a pixel electrode 42, and to provide a desirable electric connection, the electrode bar 53 and the pixel electrode 42 are made from the same conductive material, which is, for example, at least one of Indium Tin Oxide (ITO), Indium Zinc Oxide (IZO), Zinc Oxide (ZnO), Indium Oxide ($In_2O_3$), Indium Gallium Oxide (IGO) and Aluminum-doped Zinc Oxide (AZO). In addition to the transparent conductive layer, the pixel electrode 42 further includes a semitransparent reflecting layer for increasing luminous efficiency. The semitransparent reflecting layer may be a thin layer (for example, several nanometers to dozens of nanometers thick) and may contain at least one of Ag, Mg, Al, Pt, Pd, Au, Ni, Nd, Ir, Cr, Li, Ca and Yb.

A projected area of the suspending metal block 52 on the backplane 10 is at least partially overlapped with that of a pixel electrode 42 unconnected with an electrode bar 53 on the backplane 10, and a projected area of the electrode bar 53 on the backplane 10 is at least partially overlapped with that of the suspending metal block 52 on the backplane 10, in this way, when a pixel unit 40 is not displayed abnormally, overlapped parts of the pixel electrode 42 and the suspending metal block 52 and those of the electrode bar 53 and the suspending metal block 52 can be treated through laser welding or chemical vapor deposition to realize an electric connection between the pixel electrode 42 and the suspended metal piece 51 and an electric connection between the electrode bar 53 and the suspending metal block 52 so that two adjacent pixel electrodes 42 have the same brightness to eliminate a defect and enable the abnormally displayed pixel unit 40 to be displayed normally.

Further, to facilitate the arrangement of the spare element 50, the spare element 50 is arranged on one end of the two adjacent pixel electrodes 42 that is away from the switch element 41.

Further, the pixel unit 40 still includes a common electrode 80 arranged in such a manner that the common electrode 80 is insulated from a corresponding pixel electrode 42. A display panel typically includes the array substrate 100, a color film substrate (not shown), and a liquid crystal layer (not shown) arranged between the array substrate 100 and the color film substrate, the common electrode 80 is a common electrode (not shown) which is located on the color film substrate to provide a common voltage and forms a storage capacitor together with the pixel electrodes 42 on the array substrate 100. The common electrode 80 can be arranged in a plurality of ways, for example, parallel to the scanning line 20, or parallel to the data line, and functionally varies according to the arrangement position thereof.

Referring to FIG. 1-FIG. 8, the repair of the array substrate 100 includes the following specific steps:

cutting off the connection of the switch element 41 and the scanning line 20, the data line 30 or the pixel electrode 42 using laser, and connecting the switch element 41 with the scanning line 20, the data line 30 or the pixel electrode 42 in an insulated manner; and electrically connecting the spare element 50 with the two adjacent pixel electrodes 42.

In the embodiment, after an abnormally displayed pixel unit 40 is found from a detection on the pixel units 40, the connection of the switch element 41 and the scanning line 20, the data line 30 or the pixel electrode 42 is cut off using laser, and the switch element 41 is connected with the scanning line 20, the data line 30 or the pixel electrode 42 in an insulated manner. Specifically, at least one of the connection of the switch element 41 and the scanning line 20, that of the switch element 41 and the data line 30 or that of the switch element 41 and the pixel electrode 42 is cut off. In the embodiment, optionally, the connection of the switch element 41 and the pixel electrode 42 is cut off, so that the switch element 41 is electrically insulated from the pixel electrode 42, and the arrow shown in FIG. 2 indicates a direction along which laser cutting is performed.

Then, the spare element 50 is electrically connected with the two adjacent pixel electrodes 42 through laser welding or chemical vapor deposition to enable the abnormally displayed pixel unit 40 to be displayed normally.

In the embodiment, optionally, electrically connecting the spare element 50 with the two adjacent pixel electrodes 42 includes a step of:

melting a position where the spare element 50 is connected with the pixel electrodes in an insulated manner to electrically connect the spare element 50 with the two adjacent pixel electrodes 42.

Figure 4:
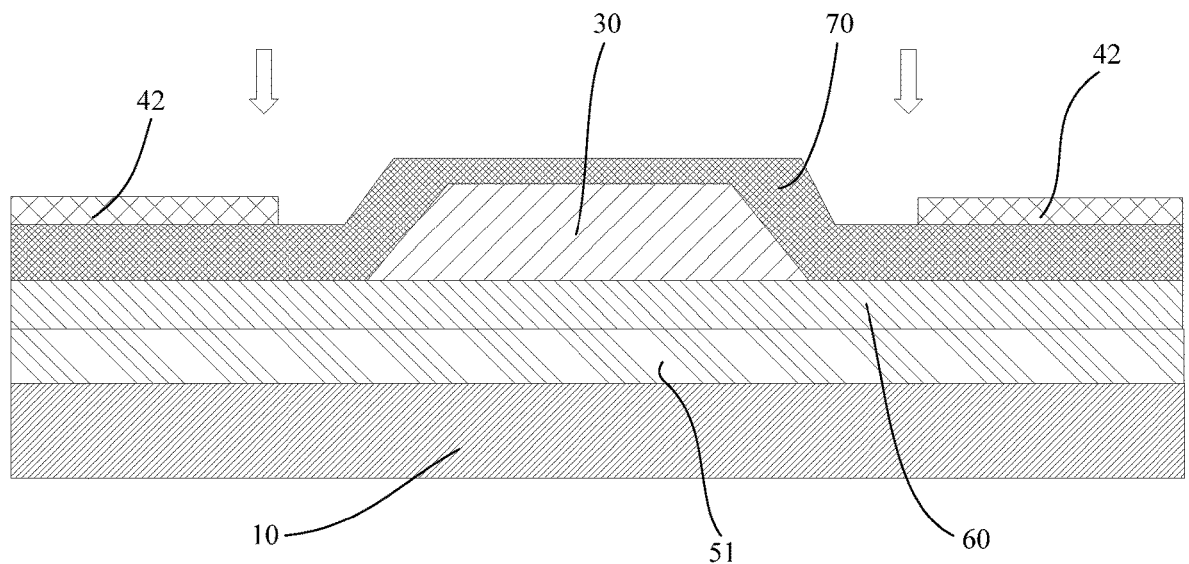
FIG. 4 is a partial sectional view of a part B-B shown in FIG. 1 before a laser welding operation is performed.
Figure 5:
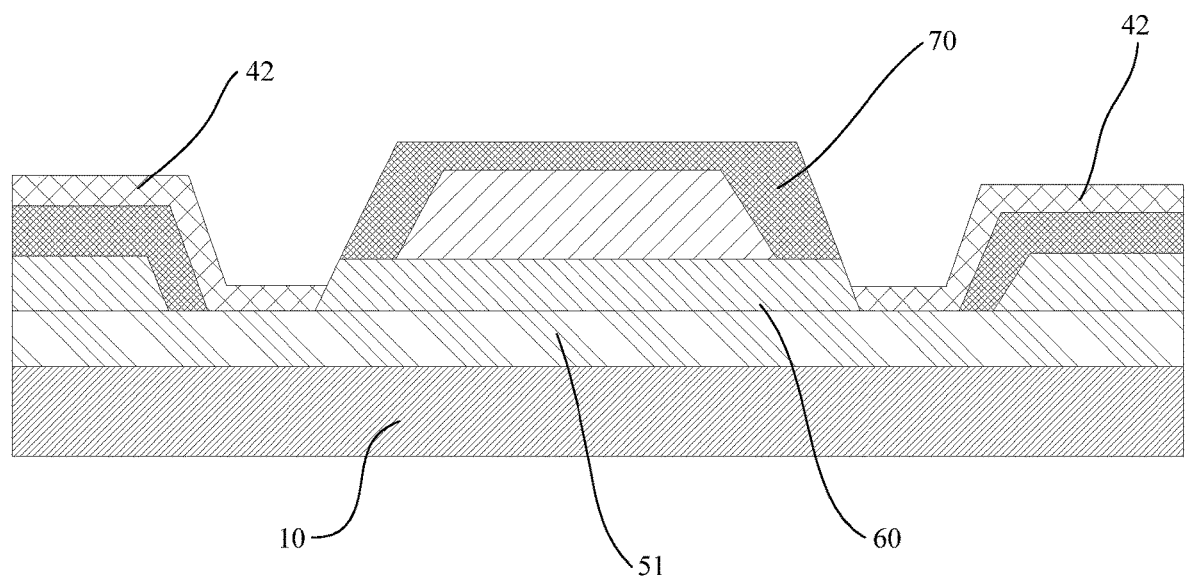
FIG. 5 is a partial sectional view of the part B-B shown in FIG. 1 after a laser welding operation is performed.

The laser energy employed by the laser welding is 0.5-1J, and that employed by the laser cutting is 1-5J, the arrows shown in FIG. 4 and FIG. 7 indicate a direction along which the laser welding is performed.

The present disclosure further provides a display panel, which includes the array substrate 100 whose specific structure can be understood with reference to the foregoing embodiments; adopting all the technical solutions of the foregoing embodiments, the display panel has all the beneficial effects brought by the technical solutions of the foregoing embodiments, and is not redundantly described here in detail.

The present disclosure further provides a display apparatus including a display panel, a specific structure of which can be understood with reference to the foregoing embodiments; adopting all the technical solutions of the foregoing embodiments, the display apparatus has all the beneficial effects brought by the technical solutions of the foregoing embodiments, and is not redundantly described here in detail.

The embodiments above are merely preferably embodiments of the present disclosure but are not to be construed as limiting the scope of the present disclosure, and any equivalent structural conversion devised based on the inventive concept of the present disclosure or using the drawing of the present disclosure, or a direct or indirect application of the present disclosure to another related technical field shall fall into the scope of protection of the present disclosure.

What is claimed is:

1. An array substrate, comprising: a backplane, and a plurality of scanning lines and a plurality of data lines which are both formed on the backplane, wherein a plurality of pixel units are defined by intersecting the plurality of scanning lines and the plurality of data lines in an insulated manner, and each of the pixel units comprises a switch element and a pixel electrode electrically connected with the switch element, the pixel electrode is electrically connected with a corresponding scanning line and a corresponding data line through the switch element, at least one spare element is arranged between two adjacent pixel electrodes, the two adjacent pixel electrodes are spaced from each other through a data line, and the spare element strides across the data line and is connected with at least one pixel electrode in an insulated manner;

wherein the spare element comprises a suspending metal block and an electrode bar that are arranged at an interval, the suspending metal block is arranged on the backplane, the electrode bar is electrically connected with one of the pixel electrodes and spaced from an adjacent pixel electrode across the data line; and a projected area of the suspending metal block on the backplane is at least partially overlapped with that of a pixel electrode unconnected with the electrode bar on the backplane, and a projected area of the electrode bar on the backplane is at least partially overlapped with that of the suspending metal block on the backplane.

2. The array substrate according to claim 1, wherein the spare element is arranged on a layer different from that on which the data line is arranged and is at least partially arranged on the =backplane, and a first insulating layer is arranged between a part of the spare element that is =arranged on the backplane and the data line.

3. The array substrate according to claim 2, wherein a second insulating layer is arranged between the two adjacent pixel electrodes and the data line, and each pixel electrode is electrically connected with the data line through a corresponding switch element.

4. The array substrate according to claim 1, wherein the spare element is arranged on one end of the two adjacent pixel electrodes that is away from the switch element.

5. The array substrate according to claim 1, wherein the pixel unit further comprises a common electrode arranged in such a manner that the common electrode is insulated from a corresponding pixel electrode.

6. The array substrate according to claim 1, wherein the switch element comprises a control terminal, an input terminal and an output terminal, the control terminal is electrically connected with a corresponding scanning line, the input terminal is electrically connected with a corresponding data line, and the output terminal is electrically connected with a corresponding pixel electrode.

7. A display panel, comprising: an array substrate comprising a backplane and a plurality of scanning lines and a plurality of data lines that are both formed on the backplane, wherein a plurality of pixel units are defined by intersecting the plurality of scanning lines and the plurality of data lines in an insulated manner, each of the pixel units comprises a switch element and a pixel electrode electrically connected with the switch element, the pixel electrode is electrically connected with a corresponding scanning line and a corresponding data line through the switch element, at least one spare element is arranged between two adjacent pixel electrodes, the two adjacent pixel electrodes are spaced from each other through a data line, and the spare element strides across the data line and is connected with at least one pixel electrode in an insulated manner;

the spare element comprises a suspending metal block and an electrode bar that are arranged at an interval, the suspending metal block is arranged on the backplane, and the electrode bar is electrically connected with one of the pixel electrodes and spaced from an adjacent pixel electrode across the data line; and a projected area of the suspending metal block on the backplane is at least partially overlapped with that of a pixel electrode unconnected with the electrode bar on the backplane, and a projected area of the electrode bar on the backplane is at least partially overlapped with that of the suspending metal block on the backplane.

8. The display panel according to claim 7, wherein the spare element is arranged on a layer different from that on which the data line is arranged and is at least partially arranged on the backplane, and a first insulating layer is arranged between a part of the spare element that is arranged on the backplane and the data line.

9. The display panel according to claim 8, wherein a second insulating layer is arranged between the two adjacent pixel electrodes and the data line, and each pixel electrode is electrically connected with the data line through a corresponding switch element.

10. The display panel according to claim 7, wherein the spare element is arranged on one end of the two adjacent pixel electrodes that is away from the switch element.

11. The display panel according to claim 7, wherein the pixel unit further comprises a common electrode arranged in such a manner that the common electrode is insulated from a corresponding pixel electrode.

12. The display panel according to claim 7, wherein the switch element comprises a control terminal, an input terminal and an output terminal, the control terminal is electrically connected with a corresponding scanning line, the input terminal is electrically connected with a corresponding data line, and the output terminal is electrically connected with a corresponding pixel electrode.

13. A display apparatus, comprising: a display panel, which comprises an array substrate that comprises a backplane and a plurality of scanning lines and a plurality of data lines that are both formed on the backplane, a plurality of pixel units are defined by intersecting the plurality of scanning lines and the plurality of data lines in an insulated manner;

each of the pixel units comprises a switch element and a pixel electrode electrically connected with the switch element, the pixel electrode is electrically connected with a corresponding scanning line and a corresponding data line through the switch element, at least one spare element is arranged between two adjacent pixel electrodes, the two adjacent pixel electrodes are spaced from each other through a data line, and the spare element strides across the data line and is connected with at least one pixel electrode in an insulated manner;

the spare element comprises a suspending metal block and an electrode bar that are arranged at an interval, the suspending metal block is arranged on the backplane, and the electrode bar is electrically connected with one of the pixel electrodes and spaced from an adjacent pixel electrode across the data line; and a projected area of the suspending metal block on the backplane is at least partially overlapped with that of a pixel electrode unconnected with the electrode bar on the backplane, and a projected area of the electrode bar on the backplane is at least partially overlapped with that of the suspending metal block on the backplane.

14. The display apparatus according to claim 13, wherein the spare element is arranged on a layer different from that on which the data line is arranged and is at least partially arranged on the backplane, and a first insulating layer is arranged between a part of the spare element that is arranged on the backplane and the data line.

15. The display apparatus according to claim 14, wherein a second insulating layer is arranged between the two adjacent pixel electrodes and the data line, and each pixel electrode is electrically connected with the data line through a corresponding switch element.

* * * * *